Dec. 16, 1924.
H. E. BARNETT
AUXILIARY TRANSMISSION FOR MOTOR CARS
Filed Sept. 10, 1924
1,519,525
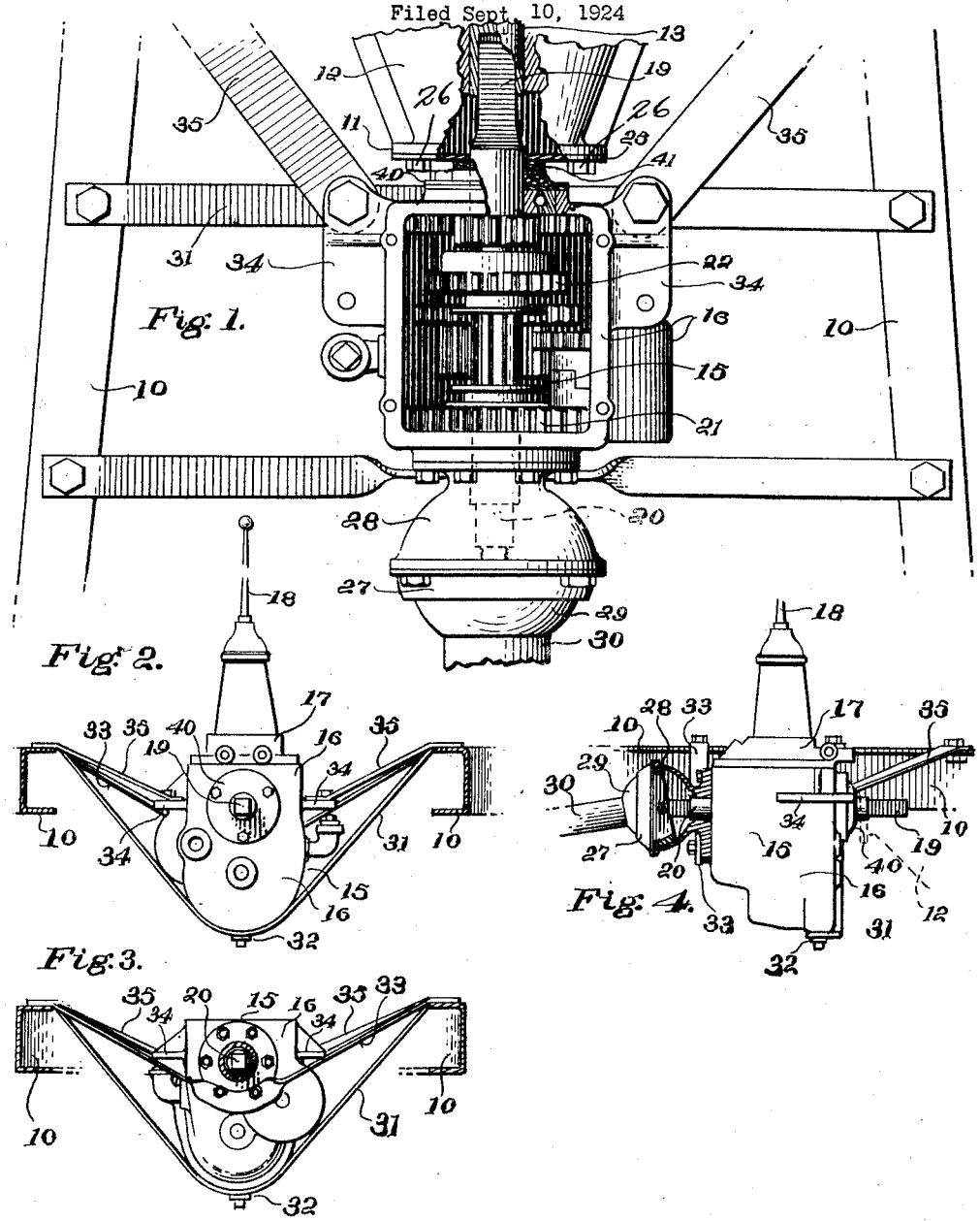
Inventor
Henry E. Barnett,
By H L Woodward
Attorney Patented Dec. 16, 1924.

1,519,525

UNITED STATES PATENT OFFICE.

HENRY E. BARNETT, OF SUMMIT, MISSISSIPPI.

AUXILIARY TRANSMISSION FOR MOTOR CARS.

Application filed September 10, 1924. Serial No. 736,937.

*To al whom it may concern:*

Be it known that I, HENRY E. BARNETT, a citizen of the United States, residing at Summit, in the county of Pike and State of Mississippi, have invented certain new and useful Improvements in Auxiliary Transmissions for Motor Cars, of which the following is a specification.

The invention has for an object to provide an improved construction in auxiliary transmissions by which motor vehicles with a given style of transmission may be converted to heavier duty types, or adapted better to the hauling of heavier loads than normal, while at the same time retaining the advantages of equally high speeds as before when running light.

It is a frequent experience in such vehicles—especially trucks—that the traction thrust communicated through housings causes breakage of the hanger arms by which the motor is mounted in the chassis frame, and it is a special object of this invention to minimize the liability of such breakage while still providing a close coupling between the auxiliary device and the regular structure, causing the auxiliary device to sustain the thrust largely, although permitting partial support of excess thrust by the usual supports. At the same time it is sought to avoid the use of special or very heavy castings or other extreme weight in mounting, since—the vehicle having been already designed for a given weight of power and transmission plant, avoidance of even small excesses of weight is important.

It is a specific purpose to present a novel junction between a regular power and transmission plant of a well known type, and the auxiliary, whereby a certain play is permitted, yet coaction provided in a proper degree.

A further important purpose is to enable the use of stock parts now familiar and ordinarily associated in one vehicle for the complete assemblage of the transmission and casings; and requiring no modified manufacture in the plant on which the auxiliary is to be installed, as well as enabling the use of a stock transmission of familiar form unchanged as the auxiliary.

In the use of motor vehicles it has been found that breakages frequently occur by reason of springing of framing, or by reason of variation from standard in manufacture or assemblage of parts, which variations are practically unavoidable. For instance, if parts are not accurately alined in drill presses, the positions of holes may be such that more than the allowed stress is communicated to certain parts; also, variations from standard of cutting tools may result in surfaces not in the planes provided for in the controlling design. These will not prevent the assemblage of a machine, and may never have an ill effect, but when a number of variations occur in a sequence contributing to the same fault in transmission of stresses, and an exceptional demand on the machine occurs they may be conceived as causes for fractures. My invention provides a compensation for such faults by which liability of failure is minimized.

Additional objects, advantages and features of invention reside in the construction, arrangement and combination and coactive relation of parts as will be more readily understood from the following description and accompanying drawings, in which—

Figure 1 is a fragmentary top view of a motor vehicle chassis, frame power-transmission plant, and drive, the transmission cover and lever being removed.

Figure 2 is a front elevation thereof.

Figure 3 is a rear view.

Figure 4 is a side elevation thereof.

There is illustrated a portion of a chassis frame 10 of a motor vehicle, the parts of this frame shown being the channel side members. There is shown also, the rear extremity 11 of a combined power and transmission plant of a familiar type now largely used, this comprising a casing 12 which is usually so constructed and connected to the running gear as to receive the thrust from the tractive action of the rear wheels of the vehicle on which it is employed, and being mounted by hanger arms not shown, and otherwise so as to transmit this thrust to the frame 10, these details of mounting being generally familiar. A power shaft 13 is also shown in the casing 12, which delivers the power to the motor, a speed change gearing not shown being incorporated in the plant ordinarily, although this is not essential to the present invention. The shaft 13 is—in the particular vehicle indicated—known as the shaft of the driving plate of the transmission in the case 12, which transmission may be referred to as the primary transmission.

A transmission 15 is disposed rearwardly of the case 12, including a case 16 and cover 17 on which a familiar form of gear shift lever 18 is mounted, while in the case 16 a familiar form of gearing for converting motion is installed, the details of which comprise no novel part of the present invention. While it is desirable that the transmission 15 shall have a forward power receiving shaft 19 and a rear power delivery shaft 20 both on the same axis, coaxial relation is not essential. The transmission shown includes two sliding gears 21—22, which are shifted by coupling means of a usual form on the cover 17 the details of which are not shown. In a particular transmission indicated, motion in three speeds forward and one reverse may be produced from movement of the shaft 13 in one direction. When my device is used as an auxiliary to a primary transmission, the number of forward speeds possible is multiplied by the number produced in the primary transmission (two speeds), plus one, the latter resulting from putting both transmissions in reverse positions. That is—there would be possible seven variations of forward speed.

The shaft 19 is ground to a square form to fit snugly the corresponding opening in the shaft 13, properly, and it should be noted that a space is left within the shaft 13 in advance of the shaft 19, permitting the latter to slide forwardly therein at times.

The rear end of the case 12 is closed by means of a resilient plate 25, which has been ordinarily formed of stock sheet steel about $\frac{1}{16}$ (one-sixteenth) inch thick, bolted to the case 12 by the usual bolts 26 which are customarily employed to hold a rear universal ball cap 27, now mounted on a hollow semi-spherical ball thrust socket fitting 28 at the rear of the transmission case 16, the fitting 28 being a stock part of this particular form of transmission. A ball 29 is thereby held, from which extends a drive shaft housing 30 fixed on the ball which, as is well known, transmits the traction thrust from the rear axle through the ball to the universal ball thrust socket. The drive is transmitted from the shaft 20 through any usual universal joint and drive shaft as customary. In the particular vehicle indicated it is customary for the forward end of the drive shaft to be squared, and the respective knuckle elements of the universal joint may therefore both be made to fit squared shafts, making the assembly quite simple.

The transmission case 16 is supported directly from the frame 10 by means of a strap 31 with the axis of the shafts 19—20 a distance below the top of the frame. The strap 31 is secured at the top sides of the side members, and is passed beneath the case 16, being apertured at its lower part and spread to receive a drain tit 32 formed integrally on the case. This line of support is directly adjacent the front end of the case 16. If desired, the rear part of the case may be supported by a strap 33 similarly bolted to the top of the frame 10. Its intermediate portion is twisted to lie in a vertical plane curved and apertured to receive the lowermost two assembly bolts holding the ball socket 28 to the case 16. This case is provided at the forward end with integral horizontal bracket plates 34 on each side. To these ears there are bolted brace straps 35 which are extended forwardly diagonally outward and upwardly, and are bolted on top of the side members of the frame 10 as in Figure 4. It will be noted that the points at which the forward ends of these straps are bolted to the frame are in or slightly above a plane coincident with the axis of the drive shaft housing 30, so that when a severe tractive pressure is transmitted through the housing 30, the tendency for the transmission to be lifted will be minimized, and also racking of the transverse supports 31—33. At the same time, the straps 33 are of moderate strength, so that they are capable of resilient yielding under excessive stress. Excess pressure will thus be transmitted to the plate 25 and the excess gradually taken up by the regular mounting of the engine and primary transmission.

A bearing for the shaft 19 is provided on the front of the case 16, which may include a separate packing around the shaft, held under a dished plate 40. The central part of this plate is planiform, and in the mounting of the auxiliary transmission the plate 40 may be butted directly against the plate 25, or as shown, a thin packing washer or gasket 41 may be interposed between the two plates. The case 16 is mounted so as to normally compress this gasket sufficiently to retain oil from wasting excessively from the case 12, and in addition the gasket cushions quiets any shocks transmitted between the two casings. It may also be utilized to increase the resilient limit of movement of the case 16 relatively to the case 12. These several functions are thereby attained by the one element in an extremely simple and inexpensive manner.

The invention has special advantage for use in installing an auxiliary transmission, by which is meant—one which is added to a motor vehicle in addition to or in place of the regular transmission with the purpose of enabling the engine to move heavier loads than the normal one, or heavier than the vehicle was originally designed to carry. It is a general practice to substitute a heavier rear frame and wheels and also in many cases it becomes necessary with the regular chassis to develop greater tractive power than normal because of hilly, sandy or muddy roads. It is a fact that where conditions require this increased tractive capacity, there is a high percentage of breakage of hanger arms and other parts through which the thrust from the rear axle is transmitted, and my invention will minimize, if not eliminate, this liability. It is a further advantage of my invention that it enables the use practically unchanged as auxiliary transmissions, of a great many forms of standard transmissions not specially produced as auxiliary devices. This makes it possible to secure and use the transmission from vehicles which have been discarded as unserviceable in other parts. And as these are available in large numbers at very low cost, my form of auxiliary transmission is brought within the reach of a great many who could not afford the cost where special adapting case and connecting parts are required.

I claim:

1. In a motor vehicle transmission, a motor-carrying frame, a motor element including a revoluble power shaft, a speed-changing device including a case movable by excessive pressure relatively to said frame longitudinally of the shaft, said speed-changing device including also a power receiving shaft and a power transmitting shaft adapted to be coupled to a final drive, said speed changing device including a mounting separate from the motor frame, said power receiving shaft having an extensible and contractible connection with said power shaft.

2. The structure of claim 1, in which a resilient compression element is interposed between the mounting of said speed change gearing and motor elements whereby excessive thrust force acting between the speed-changing device and the motor carrying frame will be cushioned.

3. In a motor vehicle transmission, a vehicle frame, a power and primary drive mechanism thereon including a housing part and a power shaft extended rearwardly therein, and having a resilient closure plate across the rear part thereof, a speed-changing gearing including a housing separately mounted on the frame, and having a power-receiving shaft projected from the forward side of the last named housing, engaged revolubly through said plate and having an extensible and contractible connection with the power shaft, an element on the second housing engaging centrally of said plate, said speed changing gearing having a power transmitting shaft projected rearwardly therefrom and said last-named housing being constructed for connection with a traction-thrust housing.

4. The article of claim 3 in which the second named housing includes in its mounting diagonal braces in a plane with the mean line of thrust from the traction-thrust housing.

5. The article of claim 3 wherein the engagement between the second named housing and said plate includes a packing confined between the two, whereby thrust force communicated by the second named housing to the first named housing will be cushioned, and retention of grease and oil is effected in the one element.

6. The article of claim 3 in which the mounting of the second named housing is adapted to yield to excess thrust stresses whereby such excess is transmitted to the mounting of the first named frame.

In testimony whereof I affix my signature.

HENRY E. BARNETT.